United States Patent
Howell et al.

(10) Patent No.: US 11,893,886 B2
(45) Date of Patent: Feb. 6, 2024

(54) TRAFFIC CONTROL SYSTEM

(71) Applicant: Vivacity Labs Limited, London (GB)

(72) Inventors: Shaun Howell, London (GB); Maksis Knutins, London (GB); Rushen Patel, London (GB)

(73) Assignee: VIVACITY LABS LIMITED

( * ) Notice: Subject to any disclaimer, the term of this patent is extended or adjusted under 35 U.S.C. 154(b) by 0 days.

(21) Appl. No.: 17/609,612

(22) PCT Filed: Mar. 27, 2020

(86) PCT No.: PCT/GB2020/050832
§ 371 (c)(1),
(2) Date: Nov. 8, 2021

(87) PCT Pub. No.: WO2020/225523
PCT Pub. Date: Nov. 12, 2020

(65) Prior Publication Data
US 2022/0230540 A1    Jul. 21, 2022

(30) Foreign Application Priority Data
May 8, 2019 (GB) ..................... 1906494

(51) Int. Cl.
G08G 1/08    (2006.01)
G08G 1/081    (2006.01)

(52) U.S. Cl.
CPC ............... *G08G 1/08* (2013.01); *G08G 1/081* (2013.01)

(58) Field of Classification Search
None
See application file for complete search history.

(56) References Cited

U.S. PATENT DOCUMENTS

| | | | |
|---|---|---|---|
| 10,691,997 B2* | 6/2020 | Graves | G06N 3/045 |
| 11,379,748 B2* | 7/2022 | Krishnamoorthy | G06N 7/02 |
| 11,443,286 B1* | 9/2022 | Janiczek | G06Q 10/1097 |
| 2013/0099942 A1* | 4/2013 | Mantalvanos | G08G 1/082 340/910 |

(Continued)

FOREIGN PATENT DOCUMENTS

| | | |
|---|---|---|
| GB | 2279767 A | 10/1997 |
| WO | 2013086629 A1 | 6/2013 |
| WO | 2016022108 A1 | 2/2016 |

OTHER PUBLICATIONS

Xiangyu Kong et al: "Revisiting the Master-Slave Architecture in Multi-Agent Deep Reinforcement Learning", arxiv.org, Cornell University Library, 201 Olin Library Cornell University Ithaca, NY 14853, Dec. 20, 2017.

(Continued)

*Primary Examiner* — Fekadeselassie Girma
(74) *Attorney, Agent, or Firm* — Ward Law Office LLC; Jacob M. Ward

(57) ABSTRACT

A traffic control system for controlling traffic at a junction includes an intelligent traffic control agent. The intelligent traffic control agent is training using reinforcement learning, in a simulation model of the junction. The simulation model is calibrated and validated preferably using data from the same sensors which are used as inputs to the traffic control agent when deployed to control traffic at the junction.

20 Claims, 3 Drawing Sheets

(56) References Cited

U.S. PATENT DOCUMENTS

| | | | | |
|---|---|---|---|---|
| 2013/0176146 A1* | 7/2013 | Dusparic | ............... | G08G 1/07 340/907 |
| 2014/0375475 A1* | 12/2014 | Wongpiromsarn | .... | G08G 1/083 340/907 |
| 2016/0055745 A1* | 2/2016 | Karacan | ............... | H04W 4/80 701/117 |
| 2016/0293004 A1* | 10/2016 | Ai-Jawa'Deh | ....... | G08G 1/0145 |
| 2016/0350675 A1* | 12/2016 | Laks | ............... | G06N 20/00 |
| 2017/0262735 A1* | 9/2017 | Ros Sanchez | ....... | G06V 10/955 |
| 2017/0278289 A1* | 9/2017 | Marino | ............... | G06T 7/246 |
| 2018/0106133 A1* | 4/2018 | Bolchover | ......... | E21B 41/0092 |
| 2018/0190111 A1 | 7/2018 | Green et al. | | |
| 2018/0261085 A1 | 9/2018 | Liu et al. | | |
| 2018/0276565 A1* | 9/2018 | Brandao | ............... | G06N 5/022 |
| 2019/0073593 A1* | 3/2019 | Luo | ............... | G06N 3/084 |
| 2019/0130216 A1* | 5/2019 | Tomioka | ............... | G06N 20/20 |
| 2019/0147372 A1* | 5/2019 | Luo | ............... | G06V 20/56 706/20 |
| 2019/0311619 A1* | 10/2019 | Tao | ............... | G08G 1/0145 |
| 2020/0118430 A1* | 4/2020 | Kaster | ............... | G08G 1/164 |
| 2021/0018881 A1* | 1/2021 | Rezgui | ............... | G06F 40/30 |
| 2021/0065542 A1* | 3/2021 | Ji | ............... | G08G 1/096716 |

OTHER PUBLICATIONS

Jang Ingook et al: "An Agent-Based Simulation Modeling with Deep Reinforcement Learning for Smart Traffic Signal Control", 2018 International Conference on Information and Communication Technology Convergence (ICTC), IEEE, Oct. 17, 2018 (Oct. 17, 2018), pp. 1028-1030, XP033447833, DOI: 10.1109/ICTC.2018.8539377.

Park, Sung Joo and Yang, Jin Seol, "A hierarchical neural network approach to intelligent traffic control", Proceedings of 1994 IEEE International Conference on Neural Network (ICNN'94), 1994, pp. 3358-3362 vol. 5, doi: 10.1109/ICNN.1994.374775, INSPEC Accession No. 4917460, Korea, https://ieee.xplore.ieee.org/abstract/document/374775.

* cited by examiner

TRAFFIC CONTROL SYSTEM

CROSS REFERENCE TO RELATED APPLICATIONS

The present application claims the benefit to International Application No. PCT/GB2020/050832 filed on Mar. 27, 2020 and U.K. Patent Application No. GB1906494.8 filed on May 8, 2019, which are incorporated herein by reference in their entireties.

FIELD

The present invention relates to a traffic control system, in particular a system utilising intelligent agents trained by reinforcement learning to control traffic, for example at a junction in a city.

BACKGROUND

There is much current interest in actively controlling traffic, for example in order to reduce congestion, reduce pollution and fuel use, improve road safety, and encourage use of public transport.

Controlling traffic in a city environment is a particular challenge, in part due to the large number of different types of road users, for example cars, buses, bicycles, motorcycles, pedestrians and so on. The Applicant's co-pending application WO2018051200 discloses a method of using an image capture unit to identify different road users and produce data relating to those road users.

Moreover, traffic patterns in a city are constantly changing for a variety of reasons. Indeed, policies often aim to change traffic patterns for example by encouraging road users to walk or cycle instead of drive. In the short term, traffic can be impacted by weather and large events. Cyclic changes may occur, for example, more people cycling in the summer. On top of that there may be longer term shifts due to changes in population patterns and responses to environmental concerns, for example.

Traffic control at junctions aims to keep traffic moving, and mitigate the effects of congestion, essentially using the available road space in the most efficient way. As a simple example, it is generally not desirable to have a queue of traffic waiting at a red light when there is no traffic at all approaching the green signal. The most basic traffic control systems at junctions will simply cycle through signal control stages in a fixed pattern, however it is known to install sensors (e.g. induction loops) to identify when traffic is approaching or waiting at different arms of a junction and control the signals accordingly, for example by extending the green lights up to a maximum duration while there are still vehicles approaching the green light.

More sophisticated systems aim to maximise certain goals in more complex ways. These systems require careful manual calibration, and performance tends to degrade over time since changes to traffic patterns will make the past calibration invalid. Unless the system is regularly recalibrated, which is a significant and costly exercise, performance will be sub-optimal. Furthermore, existing systems make it difficult for operators (e.g. city councils) to change their policies or priorities. Operators are constantly trying to meet policy objectives in transport, for example to reduce emissions and pollution. The operators have a variety of tools at their disposal to try to do this, for example by subsidising and encouraging public transport use, providing secure cycle parking, etc. For these policy changes to be most successful they can be supported by changes to traffic signal control, for example to prioritise late buses waiting at junctions, thus promoting public transport travel time reliability. However, existing systems make it difficult and expensive for operators to implement this type of change, and also to change the configuration of such changes, for example adjusting the extent to which pedestrians are prioritised.

It is an object of the present invention to provide a more adaptive and dynamic traffic control system for use at junctions, which responds automatically or semi-automatically to changes in traffic patterns so that performance is maintained without expensive manual re-calibration.

It is a further object of the invention to provide a traffic control system which may be adjusted to meet changing and potentially complex goals (for example, reducing cars in certain areas, promoting public transport, etc.).

SUMMARY

According to the present invention, there is provided a traffic control system for use at a junction, the traffic control system comprising:
 a plurality of sensors for monitoring vehicles and/or other road users at and around the junction;
 a traffic control agent subsystem; and
 traffic signals including signal outputs for controlling the vehicles and/or other users of the junction,
 the sensors providing inputs to the traffic control agent subsystem, and the traffic control agent subsystem controlling the traffic signals to optimise traffic flow in accordance with one or more goals,
in which the traffic control agent subsystem includes:
 a junction simulation model of the junction being controlled, the junction simulation model accepting inputs of traffic scenarios and accepting inputs of control decisions, and providing outputs of traffic patterns as a result of the control decisions made;
 an agent training system, in which traffic control machine learning agents are trained on the junction simulation model by reinforcement learning to optimise traffic flow in accordance with the one or more goals; and
 a live traffic control system, the live traffic control system including a traffic control machine learning agent which has been trained in the agent training system, the traffic control machine learning agent in the live traffic control system accepting inputs from the sensors and sending outputs to the traffic signals to control the traffic at the junction.

Advantageously, the traffic control system requires little or no manual calibration, because the traffic control machine learning agent has learned an effective control strategy automatically by being trained against the junction simulation model.

The model includes features which may be manually defined when the system is installed. For example, the geometry of the junction and the available traffic signals form the basis of the model. These features of the junction are unlikely to change frequently, since doing so would involve construction and/or installation work. However, other features of the model may be defined and updated at least to some extent automatically. The model is a simulation of traffic demand—a representation of journeys starting at different times with different vehicle classes (plus pedestrian journeys) and different destinations, and different routes through the network. The model will include many variations on these demands to represent both observed and predicted/hypothetical scenarios. The model is also a simulation of how vehicles are expected to behave in response to traffic conditions and the signals given, and these are characteristics which might change over time. Some embodiments may therefore include a simulation model calibration and validation subsystem, which uses inputs from the sensors to calibrate and test the junction simulation model. The aim is always to produce a model which reflects as closely as possible the real response of traffic to the simulated conditions.

As an example, a simple model may assume that all vehicles will stop at a red signal, and vehicles will stop at an amber signal if they are more than a certain distance away from the junction and travelling at less than a certain speed. However, calibrating the value of that certain distance and certain speed will allow the simulation model to make more accurate predictions about whether a particular vehicle will stop or not when a signal changes to amber.

Models may be continually re-calibrated and re-validated to ensure that the model reflects up-to-date observations as to how traffic actually behaves at the junction. This model calibration and validation may use an evolutionary algorithm in some embodiments. Keeping the model accurate and up-to-date ensures that the agents trained in the agent training system are trained to perform well when deployed to the live traffic control system.

Preferably, the model is calibrated and validated using data from the same sensors which are used for the real time monitoring of vehicles and other road users during operation of the system. The sensors may be for example sensors according to WO2018051200.

Even in embodiments where there is significant manual effort involved in keeping the model current and accurate, this work is usually significantly easier, and significantly more likely to be done accurately, than trying to manually calibrate a control system directly. For example, if a new hospital or a new school opens, then this can be manually added to the model. Ensuring that the new school is put in the right place, and relevant properties such as the times of the start and end of the school day are set correctly, is something which is fairly easy to see has been done correctly. However, trying to manually answer the question "how should the traffic signals be changed to take account of the new school" is much more difficult. Someone experienced at traffic control may be able to give a good answer, but there is effectively no way of telling whether it is really the best or optimal answer.

The sensors are preferably deployed at all arms of the junctions, and are more preferably also deployed at "upstream" positions, i.e. on the roads approaching the junction where road users may take up to several minutes to reach the junction.

The traffic control machine learning agent is trained by reinforcement learning. One or more goals are defined and the performance of the agent is measured against these goals. Examples of simple goals may include waiting time for any vehicle at the junction being under 1 minute, the maximum length of a queue being no more than 5 vehicles, etc. Goals may take into account vehicle type, for example to support a policy encouraging use of public transport a goal may include the waiting time for a bus being less than 30 seconds.

Different goals may have different weights, and/or goals may seek to maximise or minimise certain values rather than cross a fixed threshold. Indeed, it is more common to want to minimise or maximise a value (e.g. waiting time) than have a threshold goal at a specific number. The weight prioritises the different goals—e.g. it is a goal to minimise the waiting time of all vehicles, but a goal to minimise the waiting time of a bus which is full of passengers and running late may be given a greater weight than a goal to minimise the waiting time of a car with a single occupant. In general terms, a goal is a function of a measured value to a performance indicator. For example, the measured value may be the waiting time of a vehicle at the junction and the performance indicator may be a score. A shorter waiting time is always better than a longer one, and so the score will be higher for shorter waiting times. However, there may be non-linearities or discontinuities, for example, once the waiting time is over 1 minute further waiting may be considered particularly disadvantageous, and so the score for a waiting time of 1 minute 10 seconds could be considerably less than the score for a waiting time of 1 minute, whereas the score for a waiting time of 20 seconds might only be slightly less than the score for a waiting time of 10 seconds. The score given for waiting time may be given a weight and combined with other scores for other measured values, which have other weights, to judge the overall performance of the traffic control decision made.

A machine learning agent may be trained in a reinforcement learning environment to control the junction. Some systems may control multiple junctions, in which case a machine learning agent may be created and trained for each junction. Agents are created as untrained agents, and in a multi junction system all of the agents could be the same on creation. On creation, before it is trained the agent could be made to implement basic heuristic rules, or have randomly generated weights. The input of an agent is a current traffic state and the current signal state and the output is what to do with the signals.

Where a new junction is being added to a multi junction system, or even a new system is being set up, new agents might be created by copying an agent from another junction or another system with a similar junction.

In some embodiments historical states of the junction may be provided as further inputs.

In some embodiments further inputs may be provided as an "environment state". The "environment state" may include tuning parameters from a central coordinator, and may include parameters pertaining to the weighting of different goals. In some multi-junction embodiments, an agent may receive input as part of an "environment state" which includes tuning parameters output by agents controlling neighbouring junctions.

Using the environment state as an input to the model is one way to allow a system operator to dynamically adjust the weighting of certain goals—weighting of goals may be changed while an agent is running on the live system, without retraining and redeploying a new agent according to the new goals.

In some embodiments a fixed signal order may be mandatory, and therefore the decision at any particular instant in time is simply whether to change the signals or whether to leave them as they are. However, if a fixed signal order is not required at the junction, then the decision is non-binary, and the decision must include which stage should be activated next.

During training, the output from the model under training is fed into the traffic simulation model, which predicts what would happen to traffic flow as a result of that decision. The performance may then be judged by reference to the goals.

Initially agents may be created with a control strategy which is randomly defined, or based on some basic heuristics or rules which may be manually defined. An agent to control a junction is first created as a "master agent". In multi junction embodiments, a batch of "master agents" is created, with one master agent for each junction. In some embodiments, every master agent in the batch may be the same when first created, but since each master agent is being trained on a different junction it will be expected that they will quickly diverge. In some embodiments the initial agent (s) may be created with a combination of heuristics or default rules and randomly defined aspects. The object of the training exercise is that the agents will learn to control the signals in response to traffic states, in order to maximise performance according to the goal(s).

As an alternative to agents which learn a control strategy directly, agents could be configured to learn how good each possible action would be, such that it can choose the best one.

To achieve learning of the agents in the agent training system, a copy of the master agent is created. In a multi junction embodiment, typically a copy of the whole batch of master agents is created, i.e. a single "copy batch" containing a single copy of each one of the master agents. Each copy agent is called a "worker agent" and a worker agent or batch of worker agents takes part in a training "workout". Each workout involves the worker agent(s) making decisions about how to respond to a given scenario in the traffic simulation model. These decisions will be made according to the control strategy of the agent. In a multi-junction embodiment, the simulation is a model of a network of roads, or parts of a network of roads, which includes all the junctions corresponding to agents in the workout. Each agent will control its own junction in the simulation model. In the first workout, the agent is untrained and applies its default or randomly defined strategy. In some embodiments, each agent may also apply a random aspect to its decision. Once some learning has taken place, in later workouts, each agent will have developed its control strategy according to observed results on the junction which it is controlling in the simulation. Agents will become better adapted to controlling their particular junction. However, they may continue to make decisions based on a random element in order to "explore" the solution space and create as many "memories" as possible which will assist in the learning process. The decisions made are fed into the simulation model, which feeds back a prediction of what will happen to the traffic flow. This creates a set of "memories" in each agent. Memories are long lists of "transitions", where each transition includes the state shown to the agent, the decision taken by the agent, the resulting next state, and how good that resulting next state was.

In some multi junction embodiments, some workouts could involve a subset of the agents. Whether a particular agent is included in a workout may depend on the applicability of the particular scenario to the junction that the particular agent is training to control.

Other sets of memories may be created by workouts which involve a similar copy worker agent or batch of worker agents, but a different simulated scenario. In some embodiments, the same scenario may be shown to the same agent multiple times (in series or in parallel), but since there may be a random element to the decisions made, running the same scenario on the same agent multiple times may still usefully yield more different memories.

The exploration stage is preferably parallelised, whether that be across different threads, processor cores, or computers. Parallelising the exploration stage is critical in order to learn optimal control algorithms in a reasonable period of time, so that new agents can be trained and deployed to respond to changes in the traffic environment, or to respond to new requirements. Without significant parallelisation in the training phase, training a new agent in response to new priorities would potentially take months. This sort of timescale is too slow to produce a system which truly responds to changes in the city environment. Furthermore, parallelisation can be used so that there is enough time to train multiple agents for each junction. For example, a system operator could train one agent to run on days when schools are open and another agent for days during school holidays, since schools being open or not generally has a significant impact on traffic patterns in a city.

The parallelisation may be by completing multiple "workouts" at the same time, whether with the same scenario or with different scenarios, or by executing the multiple worker agents in the batch at the same time, or by a combination of those things.

The memories built up in this "exploration" stage and are then used in a "updating" stage. In the updating stage the memories, including the performance of each decision against the goals, are used to update the master agent(s) to make them more likely to repeat successful decisions and less likely to repeat unsuccessful ones. The control strategy of the master agent is updated. In cases where the agent is configured not to learn a control strategy directly but to learn how good each possible decision would be, it is this model which is updated, which implicitly updates its control strategy.

After the updating stage, the master agent(s) have different, improved, control strategies. The agent(s) can then be copied into future worker agents or batches of worker agents, for further exploration workouts.

In this way, the master agent(s) progressively improve. As the master agent(s) improve, more difficult and more complex scenarios can be presented. Through this process of exploration and reward the master agent(s) learn how to meet their goals and gradually improves their performance.

While each agent is learning, its current control strategy is regularly benchmarked against a suite of scenarios which have not been used by the agent for learning. This validates the agent by testing whether the agent has learned general strategies for managing traffic, or has overfitted to the training scenarios.

Preferably, the system is designed for continual and automatic improvement, and so as soon as a new agent has been trained which is validated as being better than the currently deployed agent, the agent in the live traffic control system will be replaced. In this way, the system automatically recalibrates and responds to changing conditions, both in the short and long term.

In some embodiments, the reinforcement learning process may continue while the traffic control machine learning agent is installed in the live traffic control system. While installed, the agent is constantly making real decisions, to control real traffic signals, based on real sensor data. It also receives constant feedback from the sensor data in terms of the results of those decisions, which can be evaluated against the goals. Therefore, the agent may continue to learn, after the simulated training phase has ended, to be more likely to repeat successful decisions and be less likely to repeat unsuccessful ones.

Although the same broad framework of reinforcement learning may be used to keep updating the agent in the live traffic control system as is used to train agents in the simulated environment, it is envisaged that the details may be quite different. For example, the extent of the exploration which the agent is allowed to undertake is likely to need to be severely restricted as compared to the exploration in the simulated environment. Allowing exploration is a trade-off between the possibility of improving the model to make better decisions in the future, and the risk of making bad decisions in the present. Since bad decisions in the live environment will have real-world adverse consequences, it is desirable to limit the extent of the exploration, i.e. to restrict the random aspect of the live agent's decisions.

Exploration is essentially any divergence by the agent from the current best-known action. Exploration may include a random aspect (random exploration).

Exploration, both in the live traffic control system and in the agent training system, may be defined in various ways. Various ways of implementing exploration are known in the field of reinforcement learning, and they involve a trade-off between "greed", i.e. exploitation of the knowledge already accumulated in the agent, and "curiosity", i.e. exploration of the currently unknown solution space. In simple embodiments, the agent may choose a random action a fraction of the time and otherwise follow a greedy policy, i.e. choose the best action according to its current knowledge. In this particular application, a more important parameter than the frequency of the random choices may be the extent to which the agent is allowed to randomly diverge from the best-known action (greedy policy). The extent of divergence from the greedy policy can potentially be allowed to be much greater in the agent training system, since the downsides of bad decisions in the agent training system do not affect real traffic flow. However the extent of divergence from the greedy policy needs to be tightly controlled in the live system, even if the frequency of exploratory decisions in the live system is similar to that of the agent training system.

In some embodiments, exploration takes place in the agent training system but not in the live traffic control system. In other words, the agent in the live traffic control system may be 100% greedy, with the only exploration taking place in the simulation in the agent training system.

In the agent training system, the exploration may be random exploration.

In other embodiments, where some exploration may take place in the live traffic control system, this may be allowed but may not be truly random exploration. Rather, the agent in the live traffic control system may take strategic deviations from the greedy strategy, for example where there is an indication that a useful knowledge gain is likely, and also where there is an indication (prediction, due to previous testing) that the result of the action will not be strongly negative. The live traffic control system is a safety-critical system and the strategy the agent takes in the live traffic control system must not risk gridlock or other seriously negative effects. An example of where useful knowledge gain is likely is where there is a scenario which has not been seen many times before, and therefore there is not a good baseline understanding of performance. An example of where there is low risk of seriously negative effects is when the volume of traffic is generally low. The agent may take into account both the potential for useful knowledge gain and the level of risk of negative effects when deciding whether to diverge from the 100% greedy strategy.

Agents which have undergone training in the live environment may in some embodiments be copied back into the simulated environment for further training and potential re-deployment. In the simulated environment, the possibility for exploration and learning is significantly increased because the extent of exploration, i.e. the level of risk-taking, can be safely increased, and also because different random variations can be tested against the same scenario. At the same time, learning in the simulated environment is subject to the limitations of the model—that the observed response to the particular decision made by the agent is inevitably only an estimate and may not be completely accurate. Learning in the live environment, while it must be slower and the exploration has to be limited, has the advantage that the observed result is definitely a true reflection of how the system responded to the chosen decision, subject to the limitations of the observation system.

The agents may be neural-network-based agents. Preferably, the agents use deep neural networks to approximate highly non-linear and highly complex functions. This offers benefits in terms of scalability and accuracy. The agents may be software running on GPU (graphics processor unit) hardware.

A user interface may be provided which enables an operator to monitor the status of the road network, including real time traffic conditions. Some facility for manual intervention may also be provided, for example allowing the system operator to select different priorities or optimisation parameters in real time.

Aspects of inverse reinforcement learning may be used. This involves agents learning to mimic an existing control strategy rather than learning their own. In practice, this involves telling the agents what decision humans (or existing products) would have made from each given state, and rewarding the agents for correctly choosing that action. In this context, choosing a "predictable" action can be of real benefit even if an alternative action might have been better optimised other goals. Drivers and other road users will be expecting a particular signal action, and it is better if road signals are more or less predictable to drivers, to avoid confusion. In an extreme case, if signals do not behave as expected drivers may assume they are broken and ignore the signals altogether. The way this can be implemented among other goals is to give some weight to the predictability of an action, in the same way that weight is given to other goals. Inverse learning can also be used to pre-train the agents with a strategy from which to then begin the previously described learning process, as this strategy will likely be much better than a random strategy and so may improve convergence likelihood and speed.

Aspects of transfer learning may be used. This involves using existing parameters (or "weights file") when initialising a new agent, instead of using random parameters or heuristic-derived parameters.

In a multi junction embodiment, aspects of multi-agent communication may be used. This involves sharing of information between agents as part of the decision-making process. In other words, the agent in charge of one junction may send information to the agent in charge of another junction. These communications include "informing" other agents of state knowledge and decisions after-the-fact, and "requesting" actions and information from other agents to better inform a decision making process. These communications may happen both in the exploration stage, i.e. when the agents are being trained in the simulation model, and between the agents deployed on the live traffic control system.

Aspects of collaborative reinforcement learning may be used. This involves a sharing of information between agents (different copies of the same agent, as well as different agents), related to memories, at the update stage. In other words, when a master agent is updating, it updates according to its own memories, but may also look at memories created by other agents, at other junctions. Pairs of junctions may be more or less similar to each other and in some embodiments a similarity measure will be defined between pairs of junctions which may be taken into account to determine the extent to which memories from other junctions are used. However, every junction is more similar to another junction than it is to a set of random parameters, so it is to be expected that memories from other junctions will have at least some relevance and usefulness in training agents.

Aspects of ensemble learning may be used. This involves combining the outcomes of multiple neural networks to determine the overall decision to take.

Aspects of data augmentation may be used. This involves strategically adding randomness to the scenarios before they are shown to agents, such that the agents never see exactly the same scenario twice. This mitigates overfitting.

During training, data streams from individual (simulated) sensors may be dropped randomly. This improves generalisation, preventing the agent from becoming too reliant on one sensor, and improved fault tolerance in the deployed system.

In some embodiments, the live traffic control system may send outputs to the traffic signals via a constraint enforcement module. The constraint enforcement module has the ability to override the machine learning agent's suggestion as to the next state of the traffic signals in order to enforce certain absolute constraints which have been programmed into the system. The machine learning agents will be trained to meet these constraints, but the constraint enforcement module guarantees that they are met. The constraint enforcement module receives inputs of current state from the sensors and traffic signals, and inputs of suggested next action from the machine learning agent. The output is always the same as the suggested next action, unless this would violate an absolute constraint, in which case the constraint enforcement module may substitute an output. If the machine learning agents are appropriately trained, this should be a rare occurrence.

An example of an absolute constraint may be for example to allow a waiting pedestrian to cross within a minimum time period. This is important because where pedestrians are left waiting too long, they are particularly liable to ignore the signals and cross anyway, creating a dangerous situation.

The system of the invention provides traffic control by intelligent agents which are continually updated to ensure control strategies are appropriate to current conditions, unlike prior art systems in which performance tends to degrade as time passes after manual calibration. System operators may make changes, for example to prioritise different modes of transport, e.g. to encourage cycling by prioritising signals for cyclists. Traditional techniques do not have this sort of flexibility to set goals to prioritise different transport modes and meet complex goals. Using reinforcement learning, the present invention achieves this, and in particular the system can be adapted to optimise against types of goals which were not even envisaged on system design, as long as the underlying data from the sensors supports those goals.

DESCRIPTION OF THE DRAWINGS

For a better understanding of the invention, and to show more clearly how it may be carried into effect, particular embodiments and implementation details will now be described, by way of example only, with reference to the accompanying drawings, in which.

DETAILED DESCRIPTION

Figure 1:
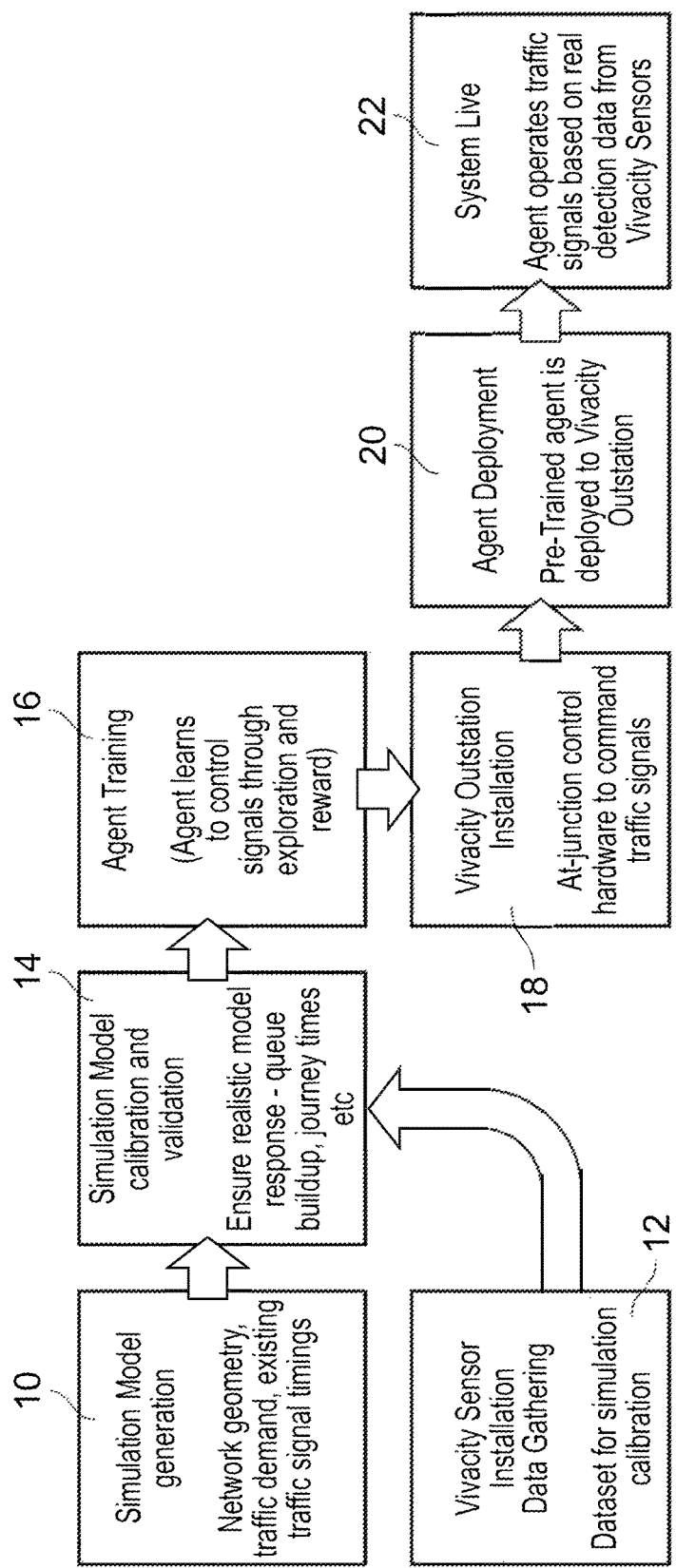
FIG. 1 is a block diagram outlining the process of training and deploying intelligent traffic control agents.

Referring firstly to FIG. 1, the processes involved in training and deploying intelligent traffic control agents are set out schematically and in brief.

In box 10, a simulation model of the junction is generated. This involves defining the basic features of the junction, including its geometry and positions of signals, and the sources of traffic demand, as well as traffic signal control details at nearby junctions not under the control of the presently described invention. In a multi junction embodiment, i.e. where multiple junctions are controlled, the simulation model may include multiple junctions controlled by the system, so that multiple agents for different junctions may be trained in one model. In some embodiments there may be only one junction controlled by the system, but other, non-controlled nearby junctions may be included in the simulation model regardless of the number of controlled junctions included in the model. The object is to create a model which can be used to test different intelligent agents and score the decisions made by those intelligent agents according to certain goals. The intelligent agent can look at the model to determine the state of traffic, make a decision and cause the signals within the model to change. The intelligent agent may then observe the effect that its decision has had within the model, forming a memory.

Box 12 represents data from installed sensors at the real junction which is being modelled. The sensor data is used to calibrate and validate the simulation model in box 14. The model generation in box 12 might be a mostly or fully manual process, which defines the basic characteristics of the junction being modelled. The object of the calibration step in box 14 is to adjust the parameters of the model in order to reflect as closely as possible what really happens at the junction. In effect what is being modelled is a combination of demand patterns at the junction, and driver/road user behaviour. In particular, the response of road users to the signals can be measured so that the simulation correctly reflects, for example, how quickly a queue will build up at a red signal, how quickly a queue clears once the signal changes to green, how long pedestrians will wait before they cross regardless of the signal, etc.

The calibration and validation process in box 14 is preferably an ongoing process, in which the simulation model is constantly refined so that it reflects changing patterns in road use. Various techniques may be used to refine the simulation model, including for example evolutionary algorithms or other optimisation algorithms where an optimal model is searched for in a search space.

In box 16 an intelligent traffic control agent is trained. This is a process which happens within a simulated environment, i.e. by training the traffic control agent using the optimal simulation model created in box 14. The training process is described in more detail with reference to FIG. 2, below.

In boxes 18 and 20, a trained intelligent traffic control agent is deployed to hardware at the junction being controlled. This may involve copying the trained agent to physically different hardware, since in many embodiments the live traffic control system may be on different hardware from the training against simulation models. For example, the live traffic control system is likely to be provided on hardware physically close to the junction, so that live sensor data can be fed into the intelligent traffic control agent with low latency and without the need for costly data transfer through external networks. Close to the junction, there is likely to be limited space for the hardware which also needs to be ruggedized and secured. Therefore it is advantageous only to perform live control on this hardware close to the junction, leaving the simulation and training to hardware located in a central office where more powerful hardware can be provided at lower cost. Some data will need to be transferred between the central office and the local junction hardware, but this data is limited to updated intelligent traffic control agents, and a subset of sensor data for ongoing model calibration. Even if all of the sensor data is sent to the central office in some embodiments, the live traffic control system still benefits from reduced latency by being located at the junction.

In box 22, the trained intelligent traffic control agent is in use in the live traffic control system. In this state, learning may continue. This may be done by allowing a limited amount of exploration while the live traffic control system is live. Even if no exploration is allowed, the live traffic control system may still collect "memories" which may be sent back to the agent training subsystem to be taken into account when updating potential new versions of agents. Updating of the agent may or may not occur when it is deployed, in different embodiments. Where updating occurs, in some embodiments copies of the updated agent may be sent back to the training system for further training in the simulated environment.

Figure 2:
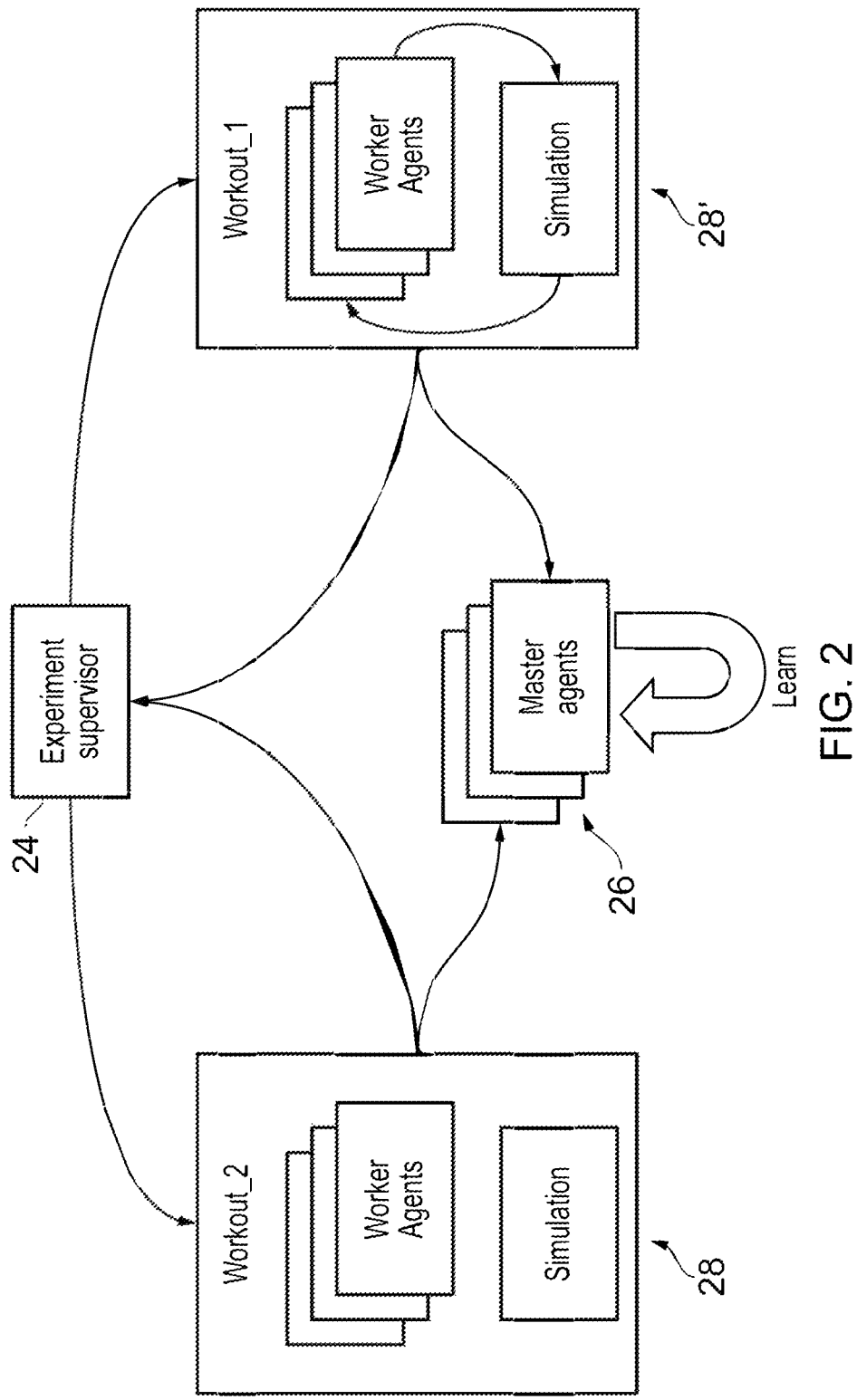
FIG. 2 is a diagram showing the parallelised process of training intelligent traffic control agents.

Referring now to FIG. 2, the training process used to train intelligent traffic control agents in the simulated environment will be described in more detail. The process is preferably parallelised, so that multiple different learning operations happen at the same time. The process is controlled by an "experiment supervisor" 24. The experiment supervisor controls the different learning processes, which may be split across different processors or machines.

The training process is based on iteratively training and updating a a master agent 26 for each junction being controlled. In this embodiment, there are multiple junctions being controlled and so there is a group of "master agents". The master agents are typically initialised with random weights or at least weights with some random aspect. Since each agent is training to control a different junction, it is expected that the agents will quickly diverge to optimal strategies tailored for the particular junction that they are being trained to control. Some embodiments may use aspects of collaborative reinforcement learning, in which the agents to some extent share memories.

To train the agents, a batch of agents called "worker agents" are created as copies of the master agents, i.e. the group of worker agents contains one worker agent for each master agent. The "worker agents" take part in a "workout" 28, 28'. This is where each worker agent in the batch is given a scenario in the simulation and has to make a decision as to what to do with the traffic signals at the junction which it is learning to control, based on what it has learned so far but also being allowed to make random decisions to some extent, in this exploration stage. The workers each control their own junction in the same scenario, the scenario encompassing the whole network of junctions in a multi junction system. In each workout, each agent uses its best policy to date, which has been copied from the master agent. The decisions made by the workers in the workout generate a set of memories, i.e. what situation the agent was presented with, what decision was made, and the result of that decision. After the workout, the master agents are updated so that decisions which proved to be good are more likely to be repeated and decisions which proved to be bad are less likely to be repeated.

Multiple workouts may take place in parallel. Multiple workouts may also take place serially, with the updating stage in between. Repeated iterations cause the agents to update and converge towards an optimal policy. Agents are regularly validated against scenarios which have not been used by the agent for learning. This checks that the agents have learned general strategies for managing traffic, rather than overfitted to perform well in only the training scenarios.

The order and timing of the scenarios presented to the agent is structured to gradually increase the depth and breadth of the agent's competency at traffic control. In other words, training begins with simple scenarios with low demand, and progresses to more complex and more difficult scenarios. As a result, the agents gradually learn an effective policy, or control strategy, for managing traffic. In some embodiments, this gradation of scenario complexity may dynamically respond to the performance of the agents, for example the agents may only be shown complex scenarios once they perform well at simple scenarios, rather than using a predefined number of iterations on each scenario.

Figure 3:
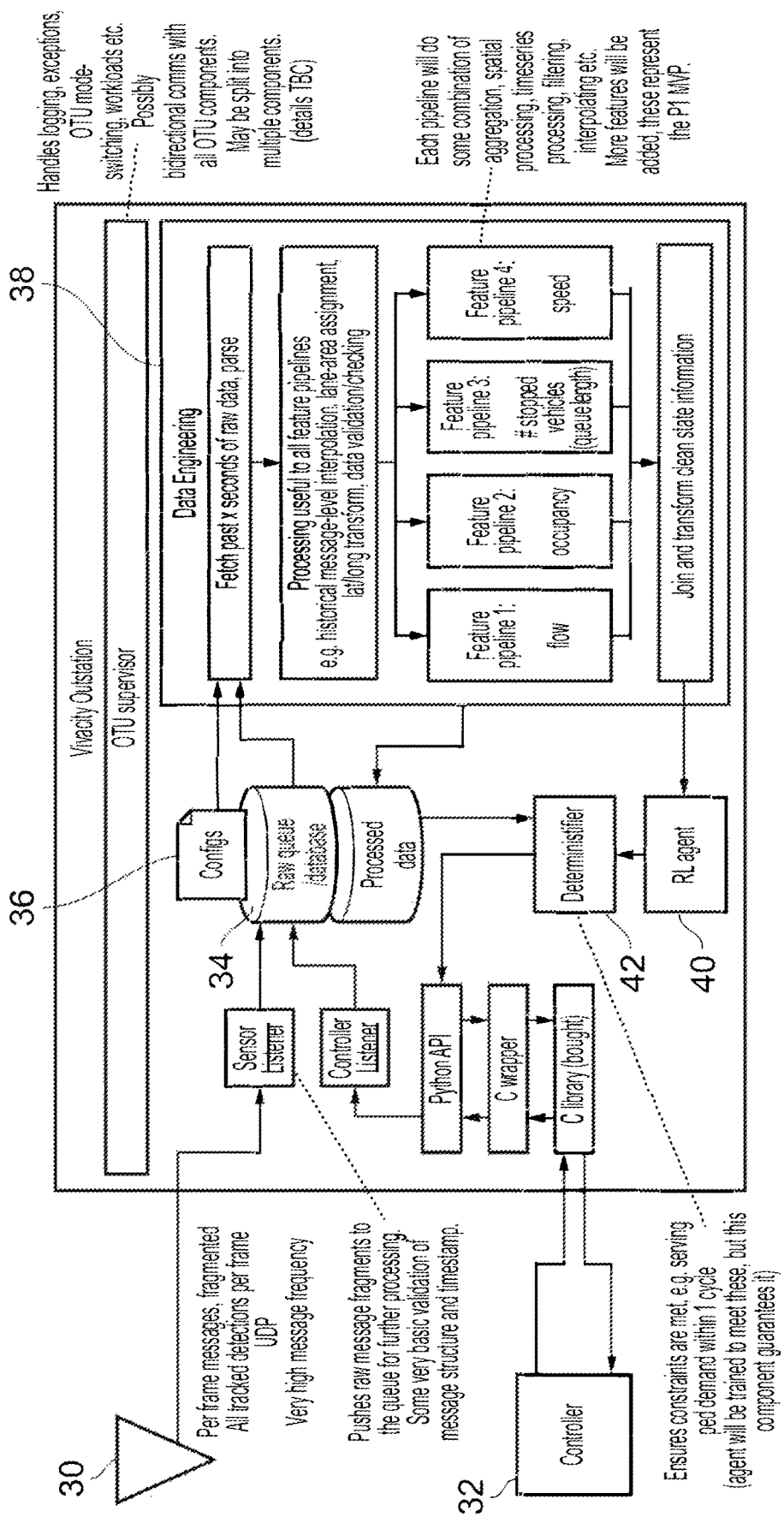
FIG. 3 is a block diagram showing the architecture of part of a traffic control system according to the invention.

Referring now to FIG. 3, a schematic of the architecture of part of a traffic control system is shown. This includes the sensors, the signals (or signal interface), and the live traffic control system. FIG. 3 does not show the parts related to simulation and agent training, which in many embodiments will be provided on physically separate hardware. All of the parts shown in FIG. 3 are preferably deployed on hardware physically close to the junction.

A group of sensors 30 is constantly sending data relating to vehicles at and around the junction. The sensors 30 can preferably recognise different types of vehicles, for example, cars, vans, buses, bicycles, and other road users, pedestrians, animals, pushchairs, etc. The group of sensors 30 therefore aims to provide as complete as possible a view of what is going on at the junction.

A traffic signal controller 32 is a standard interface which is usually already available in most existing modern traffic signal deployments. The traffic signal controller acts as both an input (of the current state of the signals) and an output (because the state of the signals can be changed).

Raw data from the sensors 30 and the traffic signal controller is buffered in a queue 34. According to configurations 36, the raw data in the queue 34 is constantly processed by a data processing subsystem 38. The data processing subsystem 38 selects relevant data and ignores irrelevant data, and processes the data to extract useful higher-level features to reflect the state of the junction. The raw data simply represents the position of every detected vehicle at each point in time. By processing the data, useful information can be extracted, for example, the current speed of flow along a particular junction arm, the number of vehicles queuing at another junction arm, the number of pedestrians waiting to cross a particular crossing and for how long they have been waiting, etc. This data processing is done in a series of pipelines, each of which will do some combination of aggregation, spatial processing, timeseries processing, filtering, interpolating, etc.

Processed data is output to an intelligent traffic control agent 40. The intelligent traffic control agent is a neural-network based agent which has been trained according to the process described above with reference to FIG. 2. The agent 40 accepts inputs related to the current state of the junction, and outputs a next state. The output is sent to the controller 32 in order to control the signals in accordance with the agent's decision, to control traffic. In this embodiment, a "deterministifier" or constraint enforcement module 42 may be interspersed between the agent 40 and the controller. The constraint enforcement module 42 acts as a backstop, preventing the agent from implementing a decision which is in conflict with certain pre-determined absolute rules. For the most part, the agents in any case will be trained so that it is unlikely that their decisions will conflict with these rules, but the constraint enforcement module guarantees that these constraints are met. The constraint enforcement module has similar (but potentially less complex) inputs to the agent 40, and acts as an override in the event of the agent 40 making a decision which breaches predetermined rules.

In many embodiments, there will in fact be multiple layers of constraint enforcement module. It is common for known traffic light signal systems, which have external interfaces via which a next state may be requested, to only allow "safe" states and safe transitions in accordance with a set of rules. As an example, a command on an external control input to make all signals green at once will simply be ignored by known traffic light system because that is not a safe state. It is simply not possible to connect any device to known traffic light systems which cause it to violate these basis rules. However, in some embodiments it is found desirable to add further constraint enforcement which is not provided by known traffic signal systems.

Therefore, it will be understood that in the system of the invention, an intelligent agent outputs what it thinks the next signal state should be, but will not directly change the state of the signal because this must be done subject to constraints enforced by potentially several layers of constraint enforcement.

The traffic control system of the invention effectively controls traffic at a junction in changing conditions, and to meet changing policy priorities. Because new agents are constantly being trained on data from the same sensors used in the live system, manual recalibration is not required, and unlike prior art systems the performance of the control system will not degrade over time.

The details of the embodiments are given by way of example only, and it will be apparent to the skilled person that various changes may be made and features combined. The scope of the invention is set out in the claims.

The invention claimed is:

1. A traffic control system for use at a junction, the traffic control system comprising:
   a plurality of sensors for monitoring vehicles and/or other road users at and around the junction;
   a traffic control agent subsystem; and
   traffic signals including signal outputs for controlling the vehicles and/or other users of the junction,
   the sensors providing inputs to the traffic control agent subsystem, and the traffic control agent subsystem controlling the traffic signals to optimise traffic flow in accordance with one or more goals,
   in which the traffic control agent subsystem includes:
      a junction simulation model of the junction being controlled, the junction simulation model accepting inputs of traffic scenarios and accepting inputs of control decisions, and providing outputs of traffic patterns as a result of the control decisions made;
      an agent training system, in which traffic control machine learning agents are trained on the junction simulation model by reinforcement learning to optimise traffic flow in accordance with one or more goals, in which a batch of master agents is created for training in the agent training subsystem, each member of the batch of agents having a control strategy which is at least in part randomly defined, in which multiple copies of the batch of master agents are created as multiple batches of worker agents, each batch of worker agents taking part in a training workout, each training workout including a different scenario or different scenarios, and the multiple workouts taking place in parallel, at the same time as each other; and
      a live traffic control system, the live traffic control system including a traffic control machine learning agent which has been trained in the agent training system, the traffic control machine learning agent in the live traffic control system accepting inputs from the sensors and sending outputs to the traffic signals to control the traffic at the junction.

2. The traffic control system of claim 1, further including a simulation model calibration and validation subsystem, in which the simulation model is calibrated and validated using inputs from the plurality of sensors.

3. The traffic control system of claim 2, in which the simulation model is continually re-calibrated and re-validated while the traffic control system is in use, controlling traffic.

4. The traffic control system of claim 1, in which there are a plurality of goals, and weights are associated with each goal for determining overall performance of an agent against the set of goals.

5. The traffic control system of claim 1, in which each traffic control machine learning agent takes an input of the current traffic state and the current signal state, and outputs a next signal state.

6. The traffic control system of claim 5, in which historical signal and/or traffic states are provided to the traffic control machine learning agents as further inputs.

7. The traffic control system of claim 1, in which the master agents are updated as a result of memories from the training workouts.

8. The traffic control system of claim 7, in which memories are shared between agents at the update stage.

9. The traffic control system of claim 7, in which the process of copying and running multiple workouts is repeated after the master agents have been updated.

10. The traffic control system of any of claim 1, in which the master agents are benchmarked against validation scenarios, the validation scenarios being different from the scenarios used in any training workout.

11. The traffic control system of claim 1, in which agents in the agent training system are repeatedly tested for performance compared to the agent in the live traffic control system, and in which an agent in the training system performing better than the agent in the live traffic control system is deployed to the live traffic control system to replace the agent in the live traffic control system.

12. The traffic control system of claim 1, in which the agent in the live traffic control system collects memories according to real traffic states, decisions made, and resulting traffic states.

13. The traffic control system of claim 12, in which the agent in the live traffic control system is updated according to collected memories while deployed in the live traffic control system.

14. The traffic control system of claim 13, in which the updated agent is copied into the agent training system as a master agent, for further training against the simulation model.

15. The traffic control system of claim 12, in which the agent in the live traffic control system makes at least some decisions which diverge from a greedy strategy by way of exploration, and in which the traffic control machine learning agents in the agent training system make at least some decisions which diverge from a greedy strategy by way of exploration, and in which the extent of exploration applied to decisions in the agent training system is greater than the extent of exploration applied to decisions in the live traffic control system.

16. The traffic control system of claim 1, in which the traffic control machine learning agents in the agent training system make decisions which are in part random exploration.

17. The traffic control system of claim 1, in which the agent training system makes multiple copies of an agent to be trained and applies each copy of the agent to be trained to a different scenario, the multiple copies being applied to the scenarios in parallel with each other.

18. The traffic control system of claim 1, in which the junction simulation model runs at a speed which is greater than real-time.

19. The traffic control system of claim 1, in which the agents are neural-network-based agents.

20. A non-transient computer readable medium containing instructions which when executed on suitable hardware implement the traffic control agent subsystem of claim 1.

\* \* \* \* \*